(No Model.)  4 Sheets—Sheet 1.

C. W. McLEAN.
MANUFACTURE OF GLASS FITTINGS AND TRIMMINGS OF BUILDINGS.

No. 253,540.  Patented Feb. 14, 1882.

WITNESSES
G. Johnson
A. H. Betz

INVENTOR
Chr. W. McLean,
By T. C. Precht
his Attorney (No Model.) 4 Sheets—Sheet 2.
C. W. McLEAN.
MANUFACTURE OF GLASS FITTINGS AND TRIMMINGS OF BUILDINGS.
No. 253,540. Patented Feb. 14, 1882.
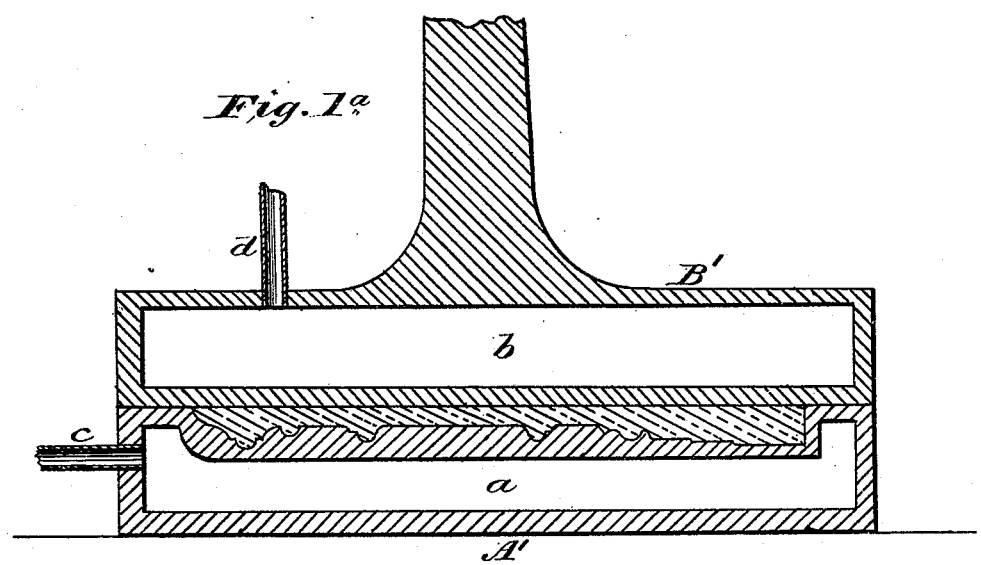
Fig. 1ª
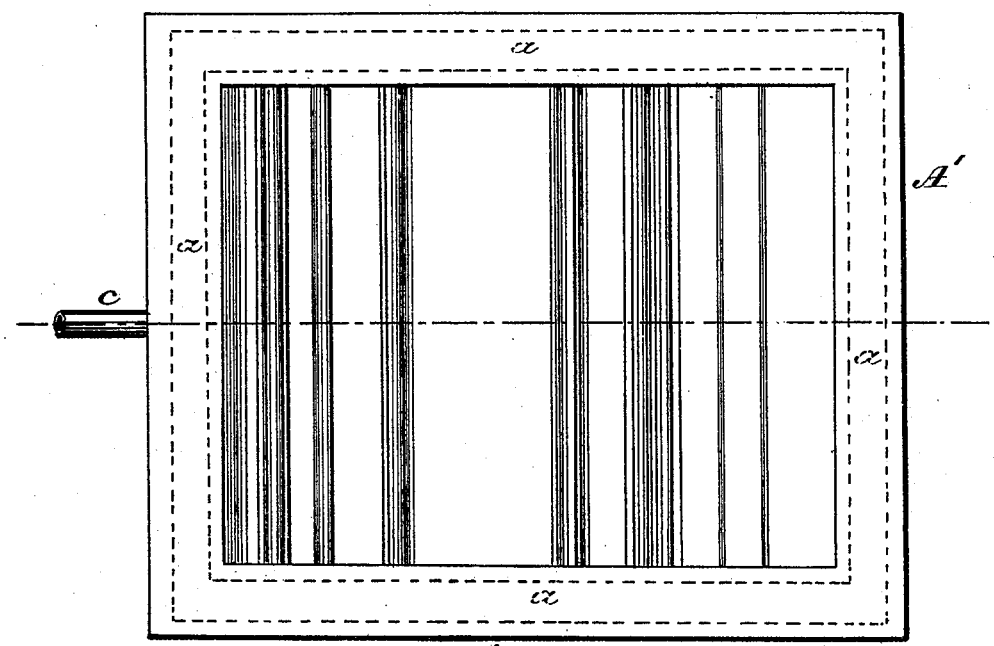
Fig. 1ᵇ
WITNESSES
R. P. Scott.
A. H. Betz
INVENTOR
Chr. W. McLean,
By T. C. Brecht
Attorney (No Model.) 4 Sheets—Sheet 3.

C. W. McLEAN.
MANUFACTURE OF GLASS FITTINGS AND TRIMMINGS OF BUILDINGS.

No. 253,540. Patented Feb. 14, 1882.

WITNESSES
G. Johnson
A. H. Betz

INVENTOR
Christopher W. McLean
By J. C. Brecht,
his Attorney

N. PETERS, Photo-Lithographer, Washington, D. C.

(No Model.)  4 Sheets—Sheet 4.

C. W. McLEAN.
MANUFACTURE OF GLASS FITTINGS AND TRIMMINGS OF BUILDINGS.

No. 253,540. Patented Feb. 14, 1882.

WITNESSES
G. Johnson
A. H. Betz.

INVENTOR
Christopher W. McLean,
By T. C. Brecht
his Attorney

UNITED STATES PATENT OFFICE.

CHRISTOPHER W. McLEAN, OF NEW BERNE, NORTH CAROLINA.

MANUFACTURE OF GLASS FITTINGS AND TRIMMINGS OF BUILDINGS.

SPECIFICATION forming part of Letters Patent No. 253,540, dated February 14, 1882.

Application filed October 4, 1881. (No model.)

*To all whom it may concern:*

Be it known that I, CHRISTOPHER W. MC-LEAN, a citizen of the United States, residing at New Berne, in the county of Craven and State of North Carolina, have invented certain new and useful Improvements in the Manufacture of Glass Fittings and Trimmings of Buildings; and I do hereby declare the following to be a full, clear, and exact description of the invention, such as will enable others skilled in the art to which it appertains to make and use the same.

Figure 1:
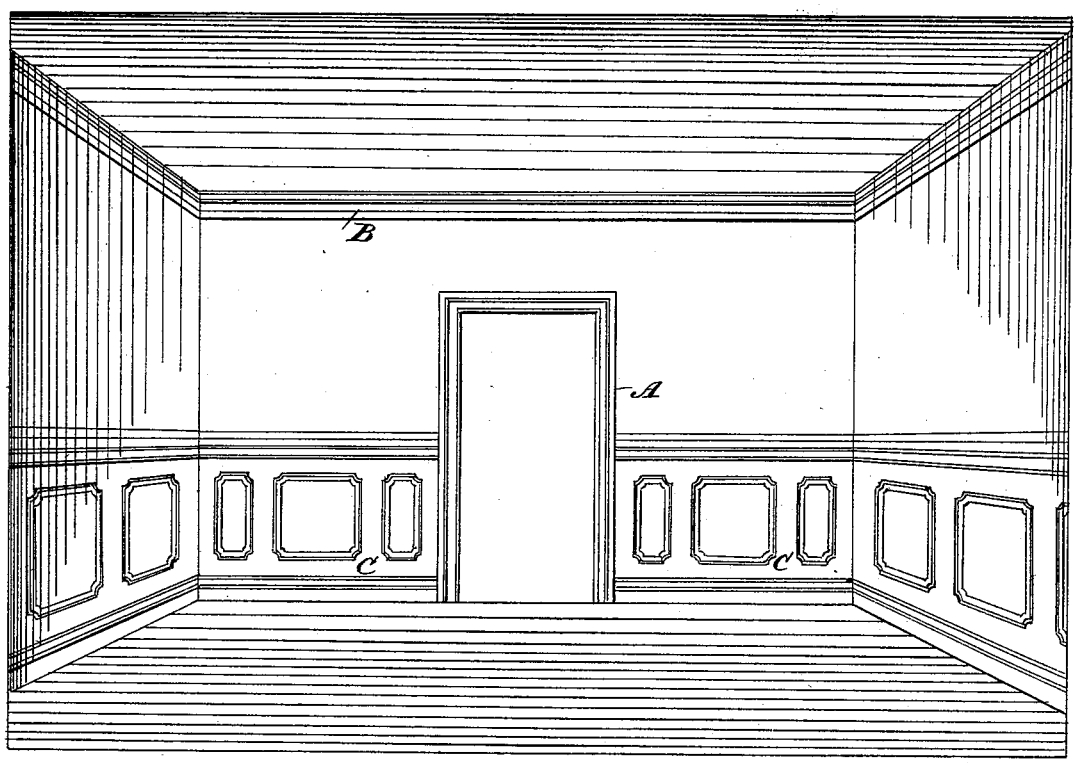
Figure 2:
Figure 3:
Figures 7, 8, 9, 10:
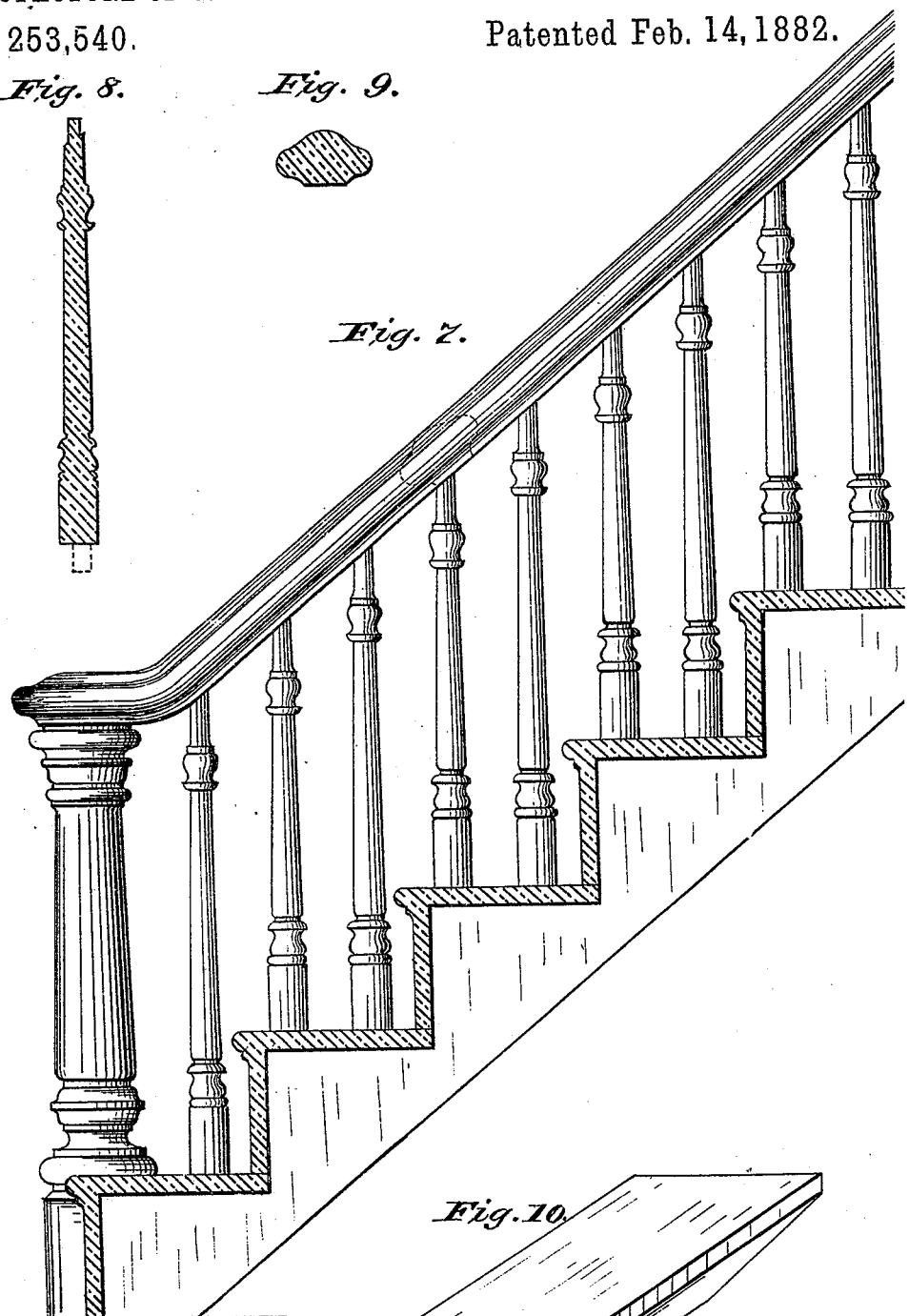
Figure 11:
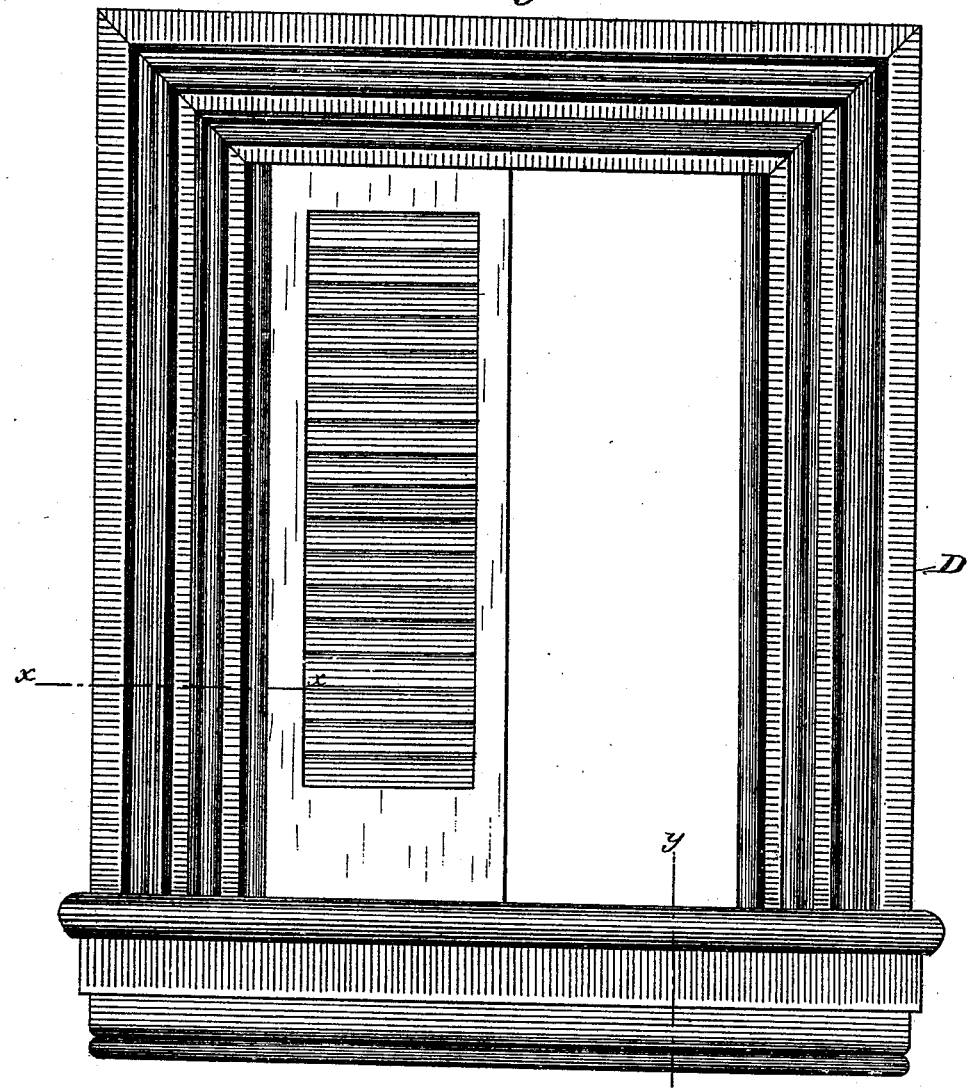
Figure 12:
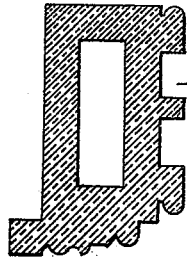
Figure 13:
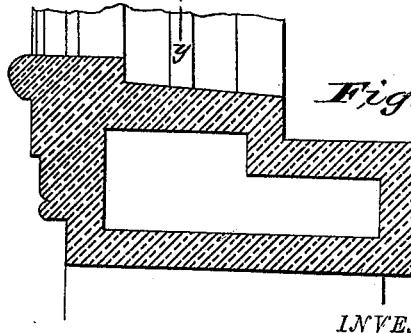

Figure 1 is a view in perspective of a room the interior finish or decorations of which are made of glass. Figs. 2, 3, 4, 5, and 6 are cross-sectional views of door-frame, sill, wash board, dado, and molding or cornice, respectively. Fig. 7 is a sectional and perspective view of a stairway constructed of glass. Fig. 8 is a sectional view of a glass baluster. Fig. 9 is a sectional view of the hand-rail. Fig. 10 is a perspective view of glass step. Fig. 11 is a front view of a window casing or frame with shutter, all of glass. Fig. 12 is a sectional view on the line $x\ x$, Fig. 11. Fig. 13 is a sectional view on the line $y\ y$, Fig. 11.

The object of my invention is to produce from glass, either plain or colored, or ornamented in any desirable manner, the interior trimmings or fittings of houses.

Heretofore such interior trimmings or fittings have been made of marble, plaster-of-paris, and wood of various kinds, and also of glass panels held in place by wood or metal strips or cement; but such trimmings are either very expensive in the cost of manufacture or are easily destroyed or marred and soon made unsightly.

Glass is as strong as many qualities of building-stones, and produces a very handsome appearance to the room. It retains its color, is not injured by the action of water, and can be cast or molded in any desired form; and, besides, always retains its bright, lustrous, polished surface. It is also capable of being decorated in various ways. Flowers, birds, fruits, landscapes, &c., can be applied in metallic colors and burned in, or they may be simply painted thereon, or eaten out or etched with acids in any well-known manner.

My invention consists in the manufacture of the various articles for the trimming and interior finish of rooms, halls, &c., by producing them by pressing or casting in molds, the molds, plungers, or cores being provided with interior heating-chambers to prevent the molten glass from chilling, and also to anneal and harden the glass in said molds, as is fully set forth in an application filed even date herewith, and marked "A."

Figure 4:
Figure 5:
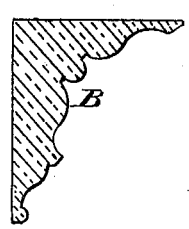
Figure 6:
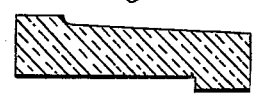

Figs. $1^a$ and $1^b$ represent a mold for pressing the trimmings, the configuration therein shown corresponding to Fig. 4 in this instance. In this figure, A' represents the lower part of the mold, having a heating-chamber, $a$, and B' is the plunger or upper part of the mold, which is also provided with a heating-chamber, $b$. To the heating-chambers in both parts of the molds pipes $c\ d$, with suitable universal joints, are connected, by which the heat is conveyed to said heating-chambers, and in this manner the glass is thoroughly annealed and hardened.

In the drawings, Fig. 1 represents the interior of a building finished with glass. A is the door-frame, and it is within the spirit of my invention to have the doors themselves made of glass, either of plain glass, ground glass, opal, or mottled, or in imitation of the rich and costly woods. B is the cornice, and may be of any desired configuration or ornamentation, chevroned or otherwise. C is the dado or plinth, and may, as heretofore stated, be provided with any desired ornamentation, cast therein or applied thereon.

In Fig. 7 I have shown a stairway. The steps or risers, balusters, hand-rail, and newel-post are all made of glass, either plain, colored, or mottled.

In Fig. 11, D represents a window-frame, made of glass, with the sash-grooves and parting-strips cast or molded therein.

It is obvious to any one acquainted with the manipulations of glass and skilled in architectural designs that all necessary and ornamental designs requisite to an elaborate and rich finish for the internal decoration of rooms, halls, churches, &c., can be made cheaply of glass.

It is also obvious that not only the articles shown in the drawings and enumerated in the specification can be made of glass for the interiors of buildings, but the entire interior—walls, ceilings, floors, window-blinds, center pieces, door and window sills, caps, frames and casings, &c.—can be made of glass, in sections of convenient size for handling, and placed in position in any convenient manner.

I am aware that glass panels have been secured in place by means of wooden or metal strips or frames, as also by cement, for the interior of buildings, and also that glass has been used as an exterior decoration, and therefore disclaim such, broadly; but,

Having thus described my invention, what I claim, and desire to secure by Letters Patent, is—

1. The method herein described of molding the interior trimmings, &c., of buildings—as sections of wainscoting, window seats or caps, stairs, door-frames, &c.—by pressing, annealing, and hardening them in molds having the base provided with a heating-chamber, and the plunger also provided with a heating-chamber, substantially as set forth.

2. The interior fittings, decorations, or linings of buildings, made of glass, annealed through the entire structure, substantially as specified.

3. An interior finishing part of a building—as a section of wainscoting, a window seat or cap, a stair, a door-frame, or the like—constructed integrally or in sections of glass, and adapted to be held in position without the use of bands or stiles made of metal or wood, said stiles or bands to be made of glass or analogous material, substantially as specified.

In testimony whereof I hereby affix my signature in presence of two witnesses.

CHRISTOPHER W. McLEAN.

Witnesses:
 GEO. R. BYINGTON,
 T. C. BRECHT.